(12) United States Patent
Chuang (10) Patent No.: US 8,006,218 B2
(45) Date of Patent: Aug. 23, 2011

(54) POWER MESH ARRANGEMENT METHOD UTILIZED IN AN INTEGRATED CIRCUIT HAVING MULTIPLE POWER DOMAINS

(75) Inventor: Chia-Lin Chuang, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 370 days.

(21) Appl. No.: 12/271,534

(22) Filed: Nov. 14, 2008
(Under 37 CFR 1.47)

(65) Prior Publication Data
US 2009/0132988 A1 May 21, 2009

(30) Foreign Application Priority Data

Nov. 15, 2007 (TW) ................. 96143160 A (51) Int. Cl.
*G06F 17/50* (2006.01)
(52) U.S. Cl. ........ 716/127; 716/120; 716/126; 716/133; 326/80
(58) Field of Classification Search .................. 716/120, 716/126, 127, 133; 326/80
See application file for complete search history.

(56) References Cited

U.S. PATENT DOCUMENTS

| | | | | |
|---|---|---|---|---|
| 4,811,237 A * | 3/1989 | Putatunda et al. | ............ | 716/127 |
| 6,493,859 B1 * | 12/2002 | Gould et al. | ................. | 716/127 |
| 6,538,314 B1 * | 3/2003 | Buffet et al. | ................. | 257/691 |
| 6,725,439 B1 * | 4/2004 | Homsinger et al. | ......... | 716/115 |
| 6,883,152 B2 * | 4/2005 | Bednar et al. | ................. | 716/113 |
| 6,901,566 B2 | 5/2005 | Mizumasa | | |
| 7,000,214 B2 * | 2/2006 | Iadanza et al. | ................ | 716/104 |
| 7,119,578 B2 * | 10/2006 | Correale et al. | ................ | 326/81 |
| 7,234,124 B2 * | 6/2007 | Chen et al. | ..................... | 716/127 |
| 7,296,251 B2 * | 11/2007 | Dhanwada et al. | ........... | 716/113 |
| 7,610,572 B2 * | 10/2009 | Kanno et al. | .................... | 716/138 |
| 7,694,241 B1 * | 4/2010 | Jadcherla et al. | ................ | 716/127 |
| 7,760,011 B2 * | 7/2010 | Wang et al. | .................... | 327/544 |
| 2005/0091629 A1 * | 4/2005 | Eisenstadt et al. | .............. | 716/13 |
| 2005/0161810 A1 | 7/2005 | Sakura et al. | | |
| 2006/0184905 A1 * | 8/2006 | Floyd et al. | ....................... | 716/5 |
| 2007/0094630 A1 * | 4/2007 | Bhooshan | ........................ | 716/13 |

FOREIGN PATENT DOCUMENTS

| | | |
|---|---|---|
| CN | 1411052 | 6/2005 |
| CN | 1701436 | 11/2005 |

* cited by examiner

*Primary Examiner* — Naum Levin
(74) *Attorney, Agent, or Firm* — Muncy, Geissler, Olds & Lowe, PLLC (57) ABSTRACT

The invention discloses a power mesh arrangement method utilized in an integrated circuit having multiple power domains. The arrangement method includes: forming a first partial local power mesh according to a position of a first power domain; forming a second partial local power mesh according to a position of a second power domain; forming a global power mesh, utilized for providing powers needed by the first and the second power domains; coupling the first partial local power mesh to the global power mesh and the first power domain; and coupling the second partial local power mesh to the global power mesh and the second power domain.

20 Claims, 6 Drawing Sheets

POWER MESH ARRANGEMENT METHOD UTILIZED IN AN INTEGRATED CIRCUIT HAVING MULTIPLE POWER DOMAINS

BACKGROUND OF THE INVENTION (a) Field of the Invention

The invention relates to a power mesh arrangement method, particular to a power mesh arrangement method applied in an integrated circuit having multiple power domains.

(b) Description of the Related Art

As the circuitry of the integrated circuit becomes more and more complicate, there are possibilities that different portions of the circuitry of a chip need different voltages (powers) at the same time. For example, the chip circuitry may have two kinds of operating modes: the normal operating mode and the sleeping mode. During the normal operating mode, the entire chip circuitry uses the operating voltage for its normal operation. But during the sleeping mode, only part of the chip circuitry needs to be maintained in the normal operating mode. Therefore, the normal operating voltage is still used by these circuits for its operation while the other circuits of the chip only need a lower voltage for maintaining the sleeping mode operation.

Therefore, different powers need to be supplied to the different circuits inside the chip so that the circuits can perform different operations during the sleeping mode. Hence, it is common practices to arrange multiple power domains in the chip circuitry. In other words, circuits in different power domains are coupled to different powers respectively so that the circuits of different power domains use different powers to support the different operations that are just mentioned.

But, the traditional circuit design approach does not provide a simple rule or step for the circuit designer to plan and design the power routing of a circuit having multiple power domains. For example, the well-known automatic placement and routing (APR) tool can only support circuits having single power domain. Therefore, a circuit designer can only rely on the most primitive method to design the power routing of multiple power domains, such as the manual routing. Obviously, such design approach is not only complicated but also inefficient.

BRIEF SUMMARY OF THE INVENTION

Therefore, one object of the invention is to provide a power mesh arrangement method for the user to design power meshes having multiple power domains more easily and to solve the problems in the prior art.

One embodiment of the invention discloses a power routing arrangement method utilized in an integrated circuit having multiple power domains. The arrangement method includes: forming a first local power mesh according to the position of a first power domain; forming a second local power mesh according to the position of a second power domain; forming a global power mesh utilized for providing powers needed by the first and the second power domains; coupling the first local power mesh to the global power mesh and the first power domain; and coupling the second local power mesh to the global power mesh and the second power domain.

Another embodiment of the invention discloses a power routing structure applicable to an integrated circuit having multiple power domains. The power mesh structure includes: a first local power mesh coupling to a first power domain; a second local power mesh coupling to a second power domain; and a global power mesh coupling to the first power domain and the second power domain to provide powers needed by the first power domain and the second domain respectively.

Another embodiment of the invention discloses a power routing structure applicable to an integrated circuit having multiple power domains. The power routing structure includes a global power mesh that is positioned above a first power domain and a second power domain. The global power mesh comprises: at least one ground wire coupling to the first power domain and the second power domain to provide the ground potential needed by the first power domain and the second power domain; at least one first power wire coupling to the first power domain to provide the voltage needed by the first power domain; and at least one second power wire coupling to the second power domain to provide the voltage needed by the second power domain.

Another embodiment of the invention discloses a power routing arrangement method utilized in an integrated circuit having multiple power domains. The arrangement method includes the following steps. At first, a global power mesh, positioned above a first power domain and a second power domain, that comprises at least one ground wire, at least one first power wire, and at least one second power wire, is provided. The first power wire provides the voltage needed by the first power domain, the second power wire provides the voltage needed by the second power domain, and the ground wire provides the ground potential needed by the first power domain and the second power domain. Then, the first power wire and the ground wire of the global power mesh are coupled to the first power domain. Finally, the second power wire and the ground wire of the global power mesh are coupled to the second power domain.

The invention provides a power mesh arrangement method and the related structure thereof for a user to easily complete the design of the power mesh of an integrated circuit having multiple power domains by following the arrangement method and its related structure. Besides, the power mesh arrangement method disclosed in the invention can be implemented in the APR tool easily so that the user can use the APR tool to automatically complete the circuit layout so as to increase the circuit design efficiency.

DETAILED DESCRIPTION OF THE INVENTION

Figure 1:
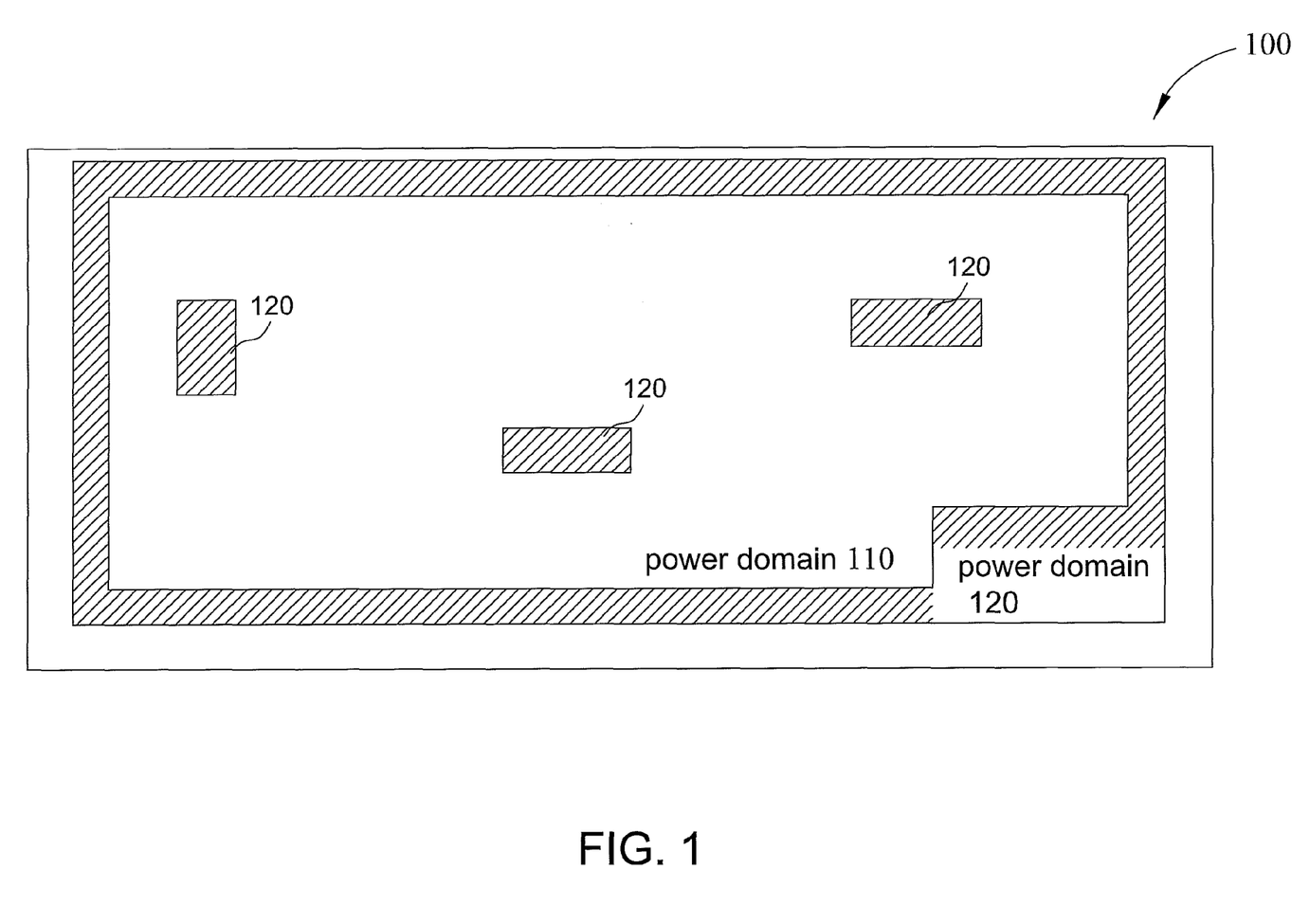
FIG. 1 shows a schematic diagram illustrating a chip having multiple power domains.

Please refer to FIG. 1 which 1 illustrates a chip 100 having multiple power domains. As shown in FIG. 1, the chip 100 has two different kinds of power domains 110, 120 where the power domain 110 is illustrated by the blank area and the power domain 120 is illustrated by the oblique line area.

As mentioned before, the power domains 110, 120 correspond to different powers that supply different voltages to the different circuits of the different power domains. It should be noted that, in the subsequent disclosure, the invention provides a power routing arrangement method and its related structure so that the user can complete the design of the power routing more easily.

Figure 2:
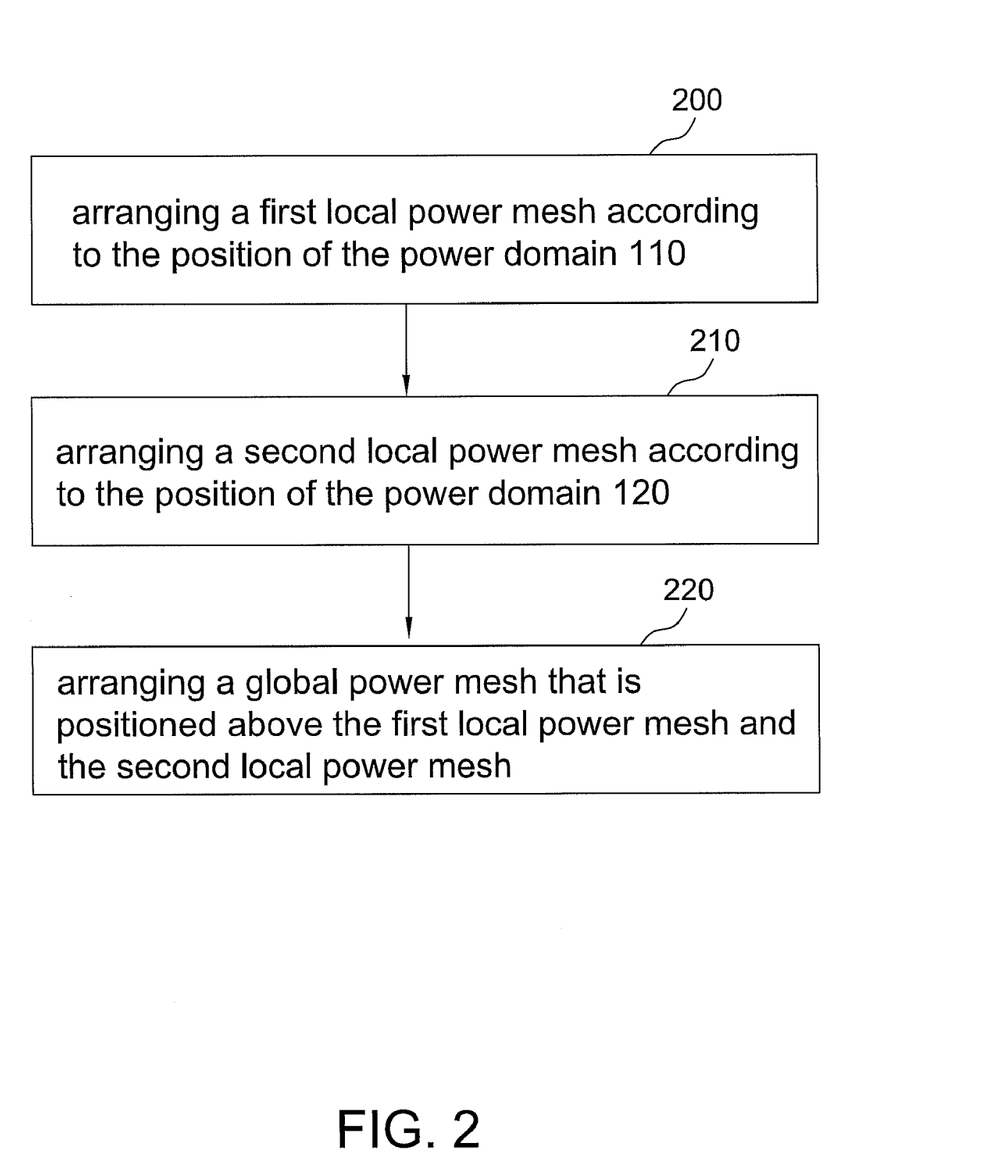
FIG. 2 shows the flow chart of the power routing arrangement method according to one embodiment of the invention.

FIG. 2 shows the flow chart of the power routing arrangement method according to one embodiment of the invention. The arrangement method of the invention comprises the following steps:

Step 200: arranging a first local power mesh according to the position of the power domain 110;

Step 210: arranging a second local power mesh according to the position of the power domain 120; and Step 220: arranging a global power mesh that is positioned above the first local power mesh and the second local power mesh.

It should be noted that the invention utilizes the local power mesh and the global power mesh to form the power routing of the power domains 110, 120. Each of the local power meshes is placed according to the positions of the power domains 110, 120 respectively (Step 200, Step 210) and the global power mesh is distributed evenly above the local power meshes (Step 220). The global power mesh couples to the external power (such as: by way of the I/O pin of the chip) to conduct the external power into the chip while the local power mesh couples to the global power mesh and the chip circuitry (that is the internal circuits of the chip corresponding to the power domains 110, 120). Then, the external power will be inputted into the chip circuitry by way of the global power mesh and the local power meshes.

Figure 3:
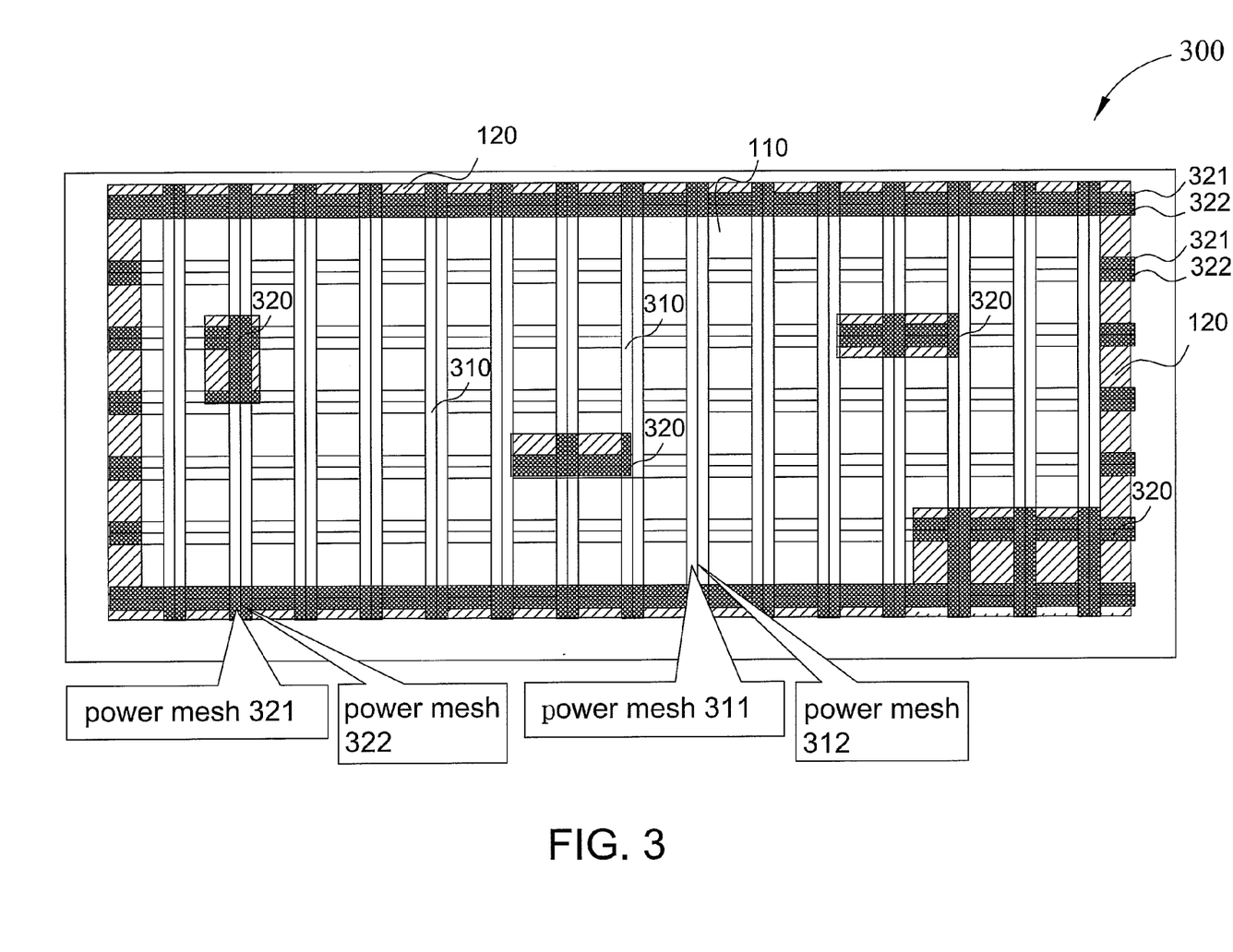
FIG. 3 shows a schematic diagram illustrating a local power mesh according to one embodiment of the chip in FIG. 1.

Please refer to FIG. 3 which shows a schematic diagram illustrating a local power mesh according to one embodiment of the invention. As shown in FIG. 3, the local power mesh can be partitioned into two different partial local power meshes 310, 320 at the positions corresponding to the positions of the power domains 110, 120. In one embodiment of the invention, the partial local power mesh 310 is placed on top of the power domain 110 and the partial local power mesh 320 is place on top of the power domain 120. Thus, the partial local power meshes 310, 320 can couple to the power domains 110, 120 positioned below by way of the via holes ("via").

Besides, as shown in FIG. 3, the partial local power meshes 310, 320 comprise web-like structures. It should be noted that the partial local power meshes 310, 320 are not interconnected (which means that the partial local power meshes 310, 320 are mutually insulated) to avoid mutual short-circuit that induces electrical uncertainty. Each of the partial local power meshes 310, 320 comprises a plurality of horizontal power supply wires and a plurality of vertical power supply wires. Please note that, as each of the partial local power meshes 310, 320 is only used to supply the powers needed by the power domains 110, 120, each of the horizontal and the vertical power supply wires only needs to comprise one ground wire and one power wire. For example, the partial local power meshes 310 comprises a power wire 311 to supply the working voltage $V_{DD1}$ needed by the power domain 110 and a ground wire 312 to supply the ground potential $V_{GND}$ needed by the power domain 110. On the other hand, the partial local power meshes 320 comprises a power wire 321 to supply the working voltage $V_{DD1}$ needed by the power domain 120 and a ground wire 322 to supply the ground potential $V_{GND}$ needed by the power domain 120.

As shown in FIG. 3, the power wire 311 and the ground wire 312 are drawn very close to each other, so are the power wire 321 and the ground wire 322. However, please note that the power wire 311 and the ground wire 312 do not touch each other (which means that the power wire 311 and the ground wire 312 are not electrically coupled) to avoid short-circuit that induces electrical uncertainty. Similarly, the power wire 321 and the ground wire 322 are also not electrically coupled to each other to avoid short-circuit that induces electrical uncertainty.

However, the above mentioned local power mesh 300 can be implemented by those who are skilled in the art without difficulty. Generally speaking, one single metal layer is used to place only one directional routing (such as the above mentioned horizontal power supply wire or the vertical power supply wire) and the routing directions of two adjacent metal layers are mutually different. Thus, the embodiments of the invention can utilize adjacent metal layers to place the above mentioned local power mesh 300. Besides, the power wires and ground wires of adjacent metal layers having the same electrical property can be interconnected to each other by via.

Figure 4:
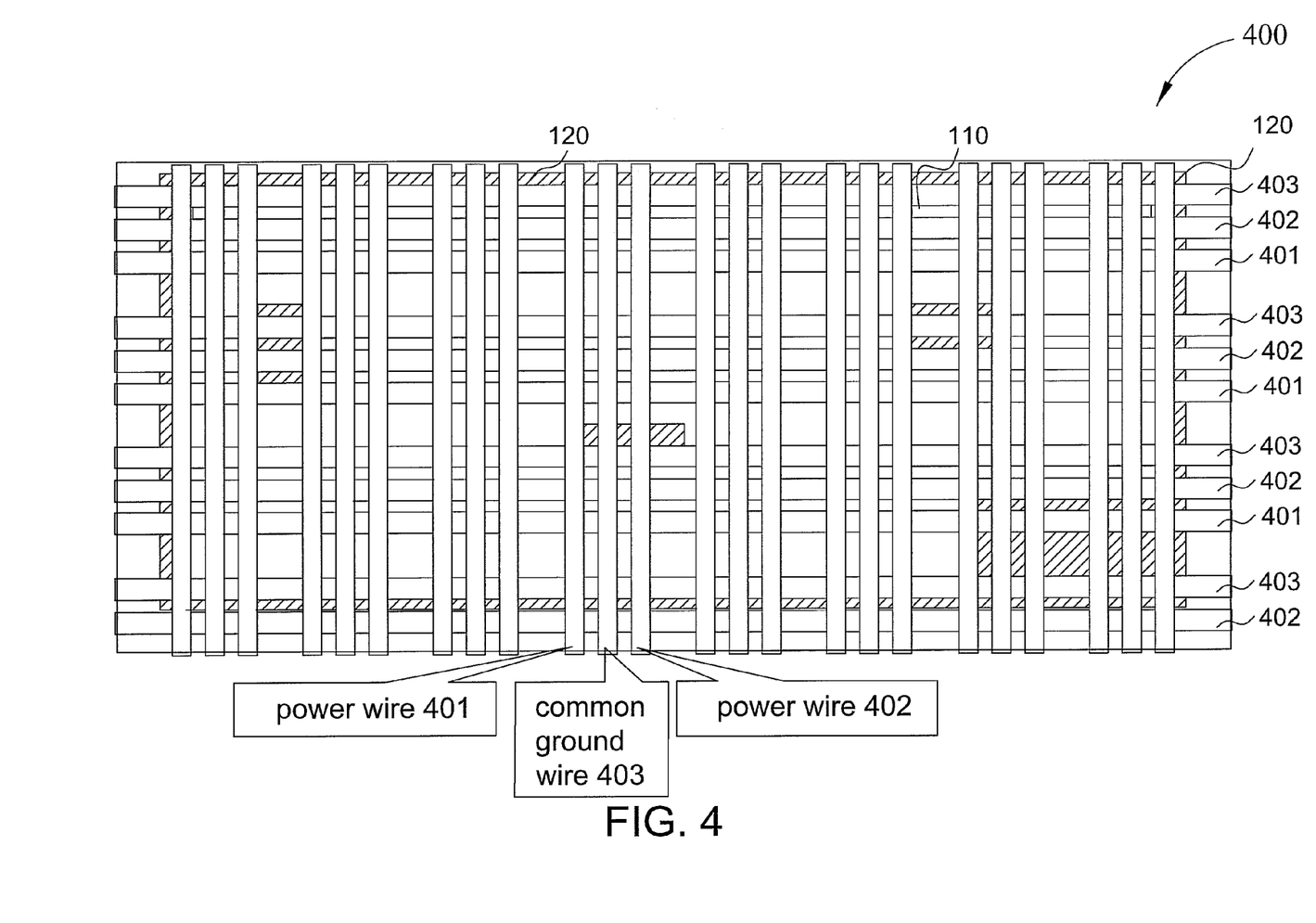
FIG. 4 shows a schematic diagram illustrating a global power mesh according to one embodiment of the invention.

Please refer to FIG. 4 which shows a schematic diagram illustrating a global power mesh 400 according to one embodiment of the invention. As shown in FIG. 4, the global power mesh 400 also comprises a web-like structure. Each global power mesh also comprises a plurality of horizontal power supply wires and a plurality of vertical power supply wires that are evenly distributed on top of the chip circuitry. In one embodiment of the invention, the global power mesh 400 is distributed just above the local power mesh 300 so that the global power mesh 400 can conduct the external power into the chip by via to couple to the local power mesh 300 located below.

Similarly, as the global power mesh 400 is to supply voltage to the entire chip, each of the horizontal and the vertical power supply wires must comprise one common ground wire 403 and two power wires 401, 402. The common ground wire 403 is used to supply the ground potential $V_{GND}$ needed by the local power meshes 310, 320. The two power wires 401, 402 are used to supply the working voltages $V_{DD1}$, $V_{DD2}$ needed by the local power meshes 310, 320, respectively.

Similarly, the global power mesh 400 can be implemented by those who are skilled in the art without difficulty. The embodiments of the invention can utilize adjacent metal layers to place the global power mesh 400. Besides, the power wires and the ground wires of adjacent metal layers having the same electrical property can be interconnected to each other by via.

Figure 5:
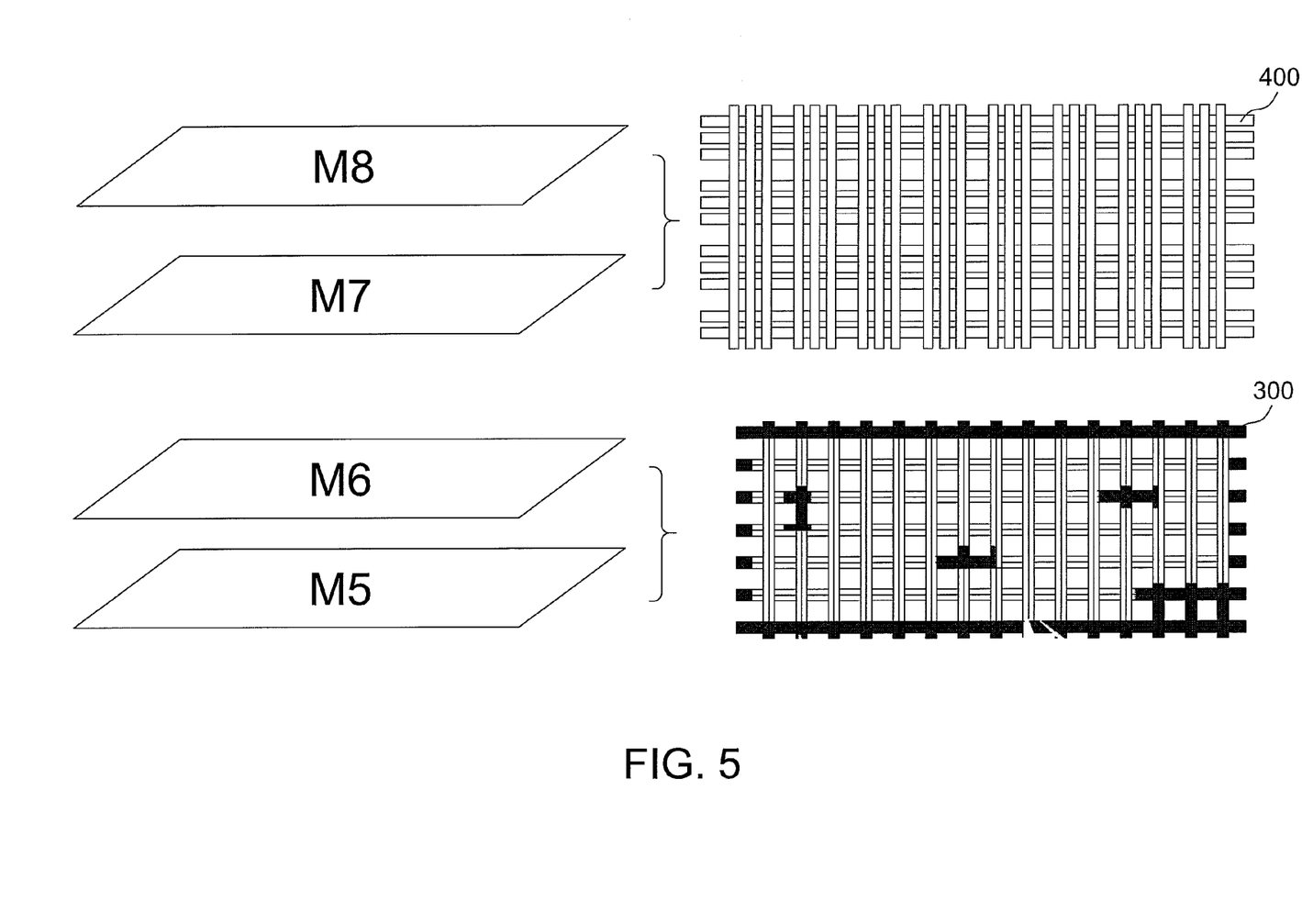
FIG. 5 shows a schematic diagram illustrating the relative positions of the local power mesh in FIG. 3 and the global power mesh in FIG. 4.

Please refer to FIG. 5 which shows a schematic diagram illustrating the positions of the global power mesh 400 and the local power mesh 300 according to one embodiment of the invention. As shown in FIG. 5, the global power mesh 400 is placed above the local power mesh 300 and the partial local power meshes 310, 320 of the local power mesh are placed separately above each power domain.

As mentioned previously, two metal layers are needed to implement either the global power mesh 400 or the local power mesh 300. In other words, the embodiments of the invention need at least four metal layers to implement the above mentioned global power mesh 400 and the local power mesh 300. However, at least four metal layers (such as: M5, M6, M7, M8 shown in FIG. 5) are generally reserved for interconnecting the conductive wires of the nodes inside the chip in advanced manufacturing processes. Therefore, the embodiments of the invention can utilize these metal layers to implement the global power mesh 400 and the local power mesh 300. For example, among the metal layers M5~M8, the local power mesh 300 can be implemented on the lower metal layers M5~M6 (such as one embodiment of the invention shown in FIG. 3: the horizontal power supply wire is placed on the metal layer M5 and the vertical power supply wire is placed on the metal layer M6). Then, the global power mesh 400 can be implemented on the corresponding metal layer M7~M8 located above (similarly, such as one embodiment of the invention shown in FIG. 4: the horizontal power supply wire is placed on the metal layer M7 and the vertical power supply wire is placed on the metal layer M8).

Figure 6:
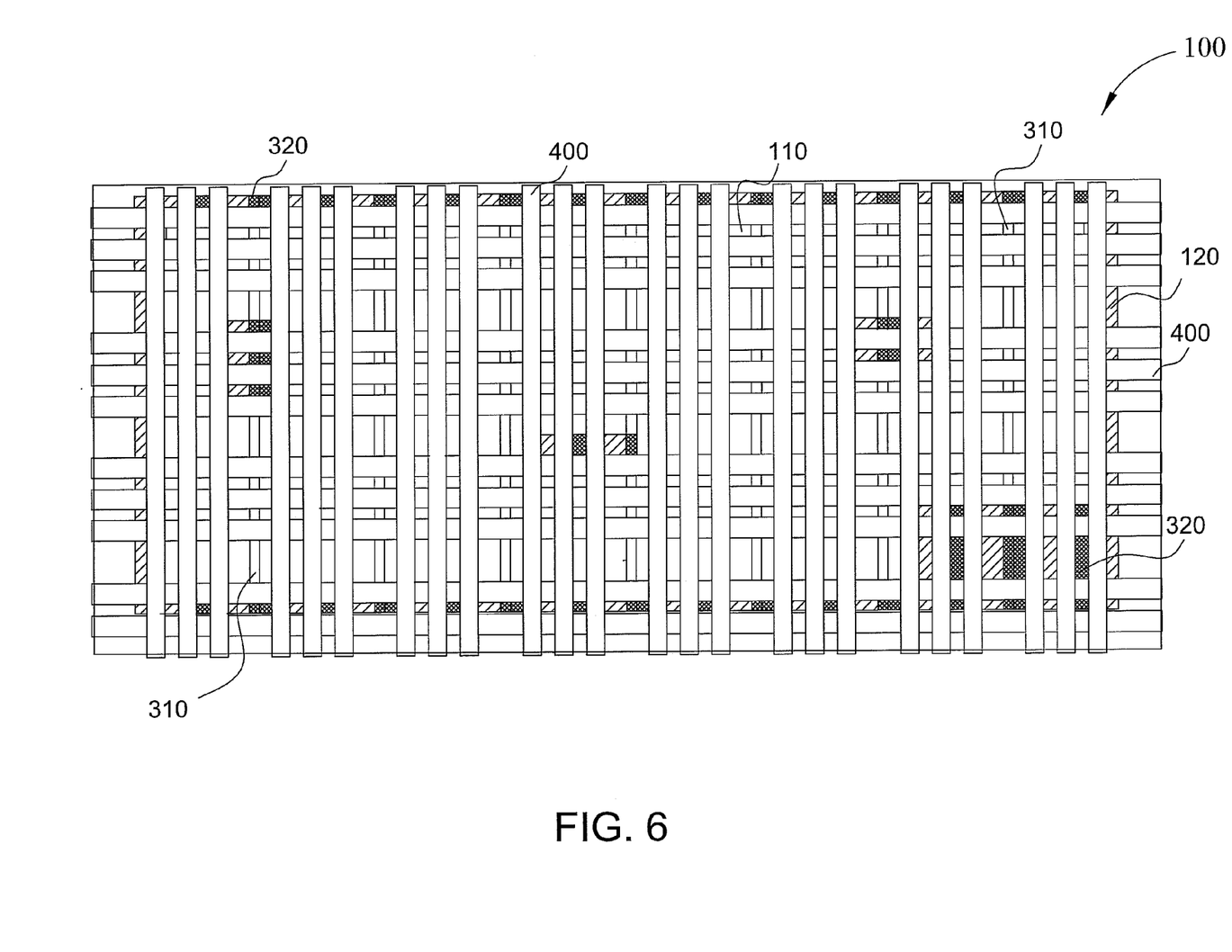
FIG. 6 shows a schematic diagram illustrating the top view of the local power mesh in FIG. 3 and the global power mesh in FIG. 4.

Please refer to FIG. 6 which shows a schematic diagram illustrating the top view of the global power mesh 400 and the local power mesh 300. In one embodiment of the invention, the power supply wire 401 that couples to the external power $V_{DD1}$ uses via (not shown in the figure) to couple to the power wire 311 located below so as to conduct the external power $V_{DD1}$ to the chip circuitry. The power supply wire 403 that couples to the external power $V_{DD2}$ uses via to couple to the power wire 321 located below so as to conduct the external power $V_{DD2}$ to the chip circuitry. On the other hand, the common ground wire 402 also conducts the external ground potential $V_{GND}$ to the chip circuitry by coupling to the ground wires 311, 312 located below by way of the via.

Thus, as the density of the global power mesh 400 and the partial local power meshes 310, 320 are sufficiently high, the mutually connecting relation between the global power mesh 400 and the partial local power meshes 310, 320 located below is guaranteed. Therefore, when the partial local power meshes 310, 320 are connected to the internal circuits in each of the power domains 110, 120, it is assured that the external powers $V_{DD1}$, $V_{DD2}$ are definitely inputted into the chip circuitry.

Besides, such structure still has other benefits. As was well-known by those who are skilled in the art, the lower metal layers are generally used for the placement of metal wires that connect the chip internal nodes, compared to the higher metal layers. Hence, the area of the lower metal layers are more precious than that of the higher metal layers. In the embodiments of the invention, the local power mesh 300 that utilizes less power supply wires (just one power wire and one ground wire) is designed to occupy less area in the lower metal layers M5, M6. The global power mesh 400 that utilizes more power supply wires (two power wires and one common ground wire) is placed in the more spacious higher metal layers M7~M8 so that the area of the metal layers M5~M6 can be released for the routing arrangement of other metal wires.

Based on the technical content disclosed in the invention so far, those who are skilled in the art should be able to understand and implement the above mentioned arrangement method and its related structure. For example, those who are skilled in the art can convert the arrangement method into an algorithm and build such an algorithm into a power routing development environment (such as the above mentioned APR tool) so that the APR tool can support the power routing design with multiple power domains.

As mentioned previously, the partial local power meshes 310, 320 have the positions corresponding to the positions of the power domains 110, 120 and are not electrically coupled to each other (that is, the partial local power meshes 310, 320 are insulated from each other) according to this embodiment of the invention. Thus, the following will describe a simple algorithm for the APR tool. Firstly, the local power mesh 300 is evenly distributed on top of the entire chip circuitry. Then, the partial local power meshes in the local power mesh 300 corresponding to the power domains 110, 120 are defined (such as partitioning the local power mesh 300 based on the positions of the power domains 110, 120 so that the plurality of partitioned power meshes are not electrically coupled to each other) to form the above mentioned partial local power meshes 310, 320. On the other hand, the approach to form the global power mesh 400 is much easier for the APR tool by just evenly distributing the global power mesh 400 on metal layers that are positioned higher.

Based on the above disclosure, those who are skilled in the art should be able to develop a suitable APR tool to draw the power mesh automatically to thereby increase the circuit design efficiency.

It should be noted that the arrangement method and its related structure disclosed is just a preferred example of the invention and should not be construed as any limitation on the implementation of the invention. The local power mesh 300 can be omitted in the invention. Only the global power mesh 400 is used to conduct the external power into the chip. For example, the global power mesh 400 can be placed on the metal layers M5, M6 directly as shown in FIG. 4. If the density of the global power mesh is high enough as mentioned previously, it can be assured that all the circuits in the chip positioned below can be coupled to the global power mesh 400 by via to receive the ground potential $V_{GND}$ and the working voltage $V_{DD1}$, $V_{DD2}$ conducted by the global power mesh 400. Such equivalent changes and modifications of the present invention are considered to be within the scope of the present invention.

It is relatively easy to implement such structure during the design of the APR tool. For example, the APR tool just needs to evenly distribute the power mesh in the metal layers M5, M6 directly. Based on the disclosure up to now, those who are skilled in the art should be able to understand and implement the necessary APR tool and the power mesh. Therefore, further details related to the development of the APR tool will not be discussed hereinafter.

It should be noted that in comparison with the embodiment of the invention illustrated in FIG. 6, implementing the global power mesh that comprises two power wires and one common ground wire directly in the metal layers M5, M6 will consume a larger area on the metal layers M5, M6. But, as the global power mesh uses only one common ground wire to supply the ground potential to the various power domains, such implementation will not waste excess large area.

Compared to the prior art, the invention provides a power mesh arrangement method and its related structure so that a user can easily complete the design of the power mesh for an integrated circuit having multiple power domains by following the arrangement method and its related structure described in the invention. Besides, the arrangement method disclosed in the invention can be implemented in the APR tool easily so that a user can use the APR tool to automatically complete the drawing of the circuit layout. Therefore, the efficiency for circuit design is increased.

Although the description of the invention is by way of above-mentioned examples of embodiment, however, it should not be construed as any limitation on the scope of the invention. Various modifications or changes can be performed by those who are skilled in the art without deviating from the scope of the invention.

What is claimed is:

1. A power routing arrangement method applied in an integrated circuit having multiple power domains, the arrangement method comprising:

forming a first partial local power mesh according to the position of a first power domain of the integrated circuit by an automatic placement and routing (APR) tool;

forming a second partial local power mesh according to the position of a second power domain of the integrated circuit by the APR tool;

forming a global power mesh that is utilized to provide the power needed by the first and the second power domains by the APR tool;
coupling the first partial local power mesh to the global power mesh and the first power domain by the APR tool; and
coupling the second partial local power mesh to the global power mesh and the second power domain by the APR tool;
wherein the global power mesh includes a plurality of horizontal power supply wires placed on a first metal layer and a plurality of vertical power supply wires placed on a second metal layer; and
wherein the first metal layer and the second metal layer are different layers.

2. The arrangement method according to claim 1, wherein the first partial local power mesh and the second partial local power mesh are positioned on the same metal layer.

3. The arrangement method according to claim 2, wherein the global power mesh and the first local power mesh are positioned on different metal layers.

4. The arrangement method according to claim 3, wherein the global power mesh is positioned above the first local power mesh.

5. The arrangement method according to claim 2, wherein the first partial local power mesh and the second partial local power mesh are not electrically coupled.

6. The arrangement method according to claim 1, wherein the global power mesh comprises at least one ground wire, at least one first power wire that provides power to the first power domain, and at least one second power wire that provides power to the second power domain.

7. The arrangement method according to claim 6, wherein the first partial local power mesh comprises: at least one first local ground wire that couples to the ground wire of the global power mesh; and at least one third power wire that couples to the first power wire and the first power domain.

8. The arrangement method according to claim 7, wherein the second partial local power mesh comprises: at least one second local ground wire that couples to the ground wire of the global power mesh; and at least one fourth power wire that couples to the second power wire and the second power domain.

9. The arrangement method according to claim 8, wherein the first local ground wire and the second local ground wire share the same ground wire of the global power mesh.

10. The arrangement method according to claim 1, wherein the positions of the first partial local power mesh and the second partial local power mesh correspond to the first power domain and the second power domain, respectively.

11. The arrangement method according to claim 1, wherein the global power mesh is distributed evenly above the first local power mesh and the area of the second local power mesh.

12. A power routing structure applied in an integrated circuit having multiple power domains, comprising:
a first partial local power mesh having its position corresponding to the position of a first power domain and coupling to the first power domain;
a second partial local power mesh having its position corresponding to the position of a second power domain and coupling to the second power domain; and
a global power mesh, coupling to the first local power mesh and the second local power mesh, to provide the power needed by the first power domain and the second domain separately;
wherein the first partial local power mesh and the second partial local power mesh are positioned on the same metal layer while the global power mesh and the first local power mesh are positioned on different metal layers;
wherein the global power mesh includes a plurality of horizontal power supply wires placed on a first metal layer and a plurality of vertical power supply wires placed on a second metal layer; and
wherein the first metal layer and the second metal layer are different layers.

13. The power routing structure according to claim 12, wherein the global power mesh is positioned above the first local power mesh.

14. The power routing structure according to claim 13, wherein the first local power mesh and the second local power mesh are not electrically coupled.

15. The power routing structure according to claim 12, wherein the global power mesh comprises: at least one ground wire; at least one first power wire that provides the power needed by the first power domain; and at least one second power wire that provides the power needed by the second power domain.

16. The power routing structure according to claim 15, wherein the first partial local power mesh comprises: at least one first local ground wire that couples to the ground wire of the global power mesh; and at least one third power wire that couples to the first power wire and the first power domain.

17. The power routing structure according to claim 16, wherein the second partial local power mesh comprises: at least one second local ground wire that couples to the ground wire of the global power mesh; and at least one fourth power wire that couples to the second power wire and the second power domain.

18. The power routing structure according to claim 17, wherein the first local ground wire and the second local ground wire share the same ground wire of the global power mesh.

19. A power routing arrangement method applied in an integrated circuit having multiple power domains, the arrangement method comprising:
providing a global power mesh, positioned above a first power domain and a second power domain, comprising at least one first power wire that provides the voltage needed by the first power domain, at least one second power wire that provides the voltage needed by the second power domain, and at least one ground wire that provides the ground potential needed by the first power domain and the second power domain by an automatic placement and routing (APR) tool;
coupling the first power wire and the ground wire of the global power mesh to the first power domain by the APR tool; and
coupling the second power wire and the ground wire of the global power mesh to the second power domain by the APR tool;
wherein the global power mesh includes a plurality of horizontal power supply wires placed on a first metal layer and a plurality of vertical power supply wires placed on a second metal layer; and
wherein the first metal layer and the second metal layer are different layers.

20. The arrangement method according to claim 19, wherein the first power domain and the second power domain share the same ground wire of the global power mesh.

* * * * *